UNITED STATES PATENT OFFICE.

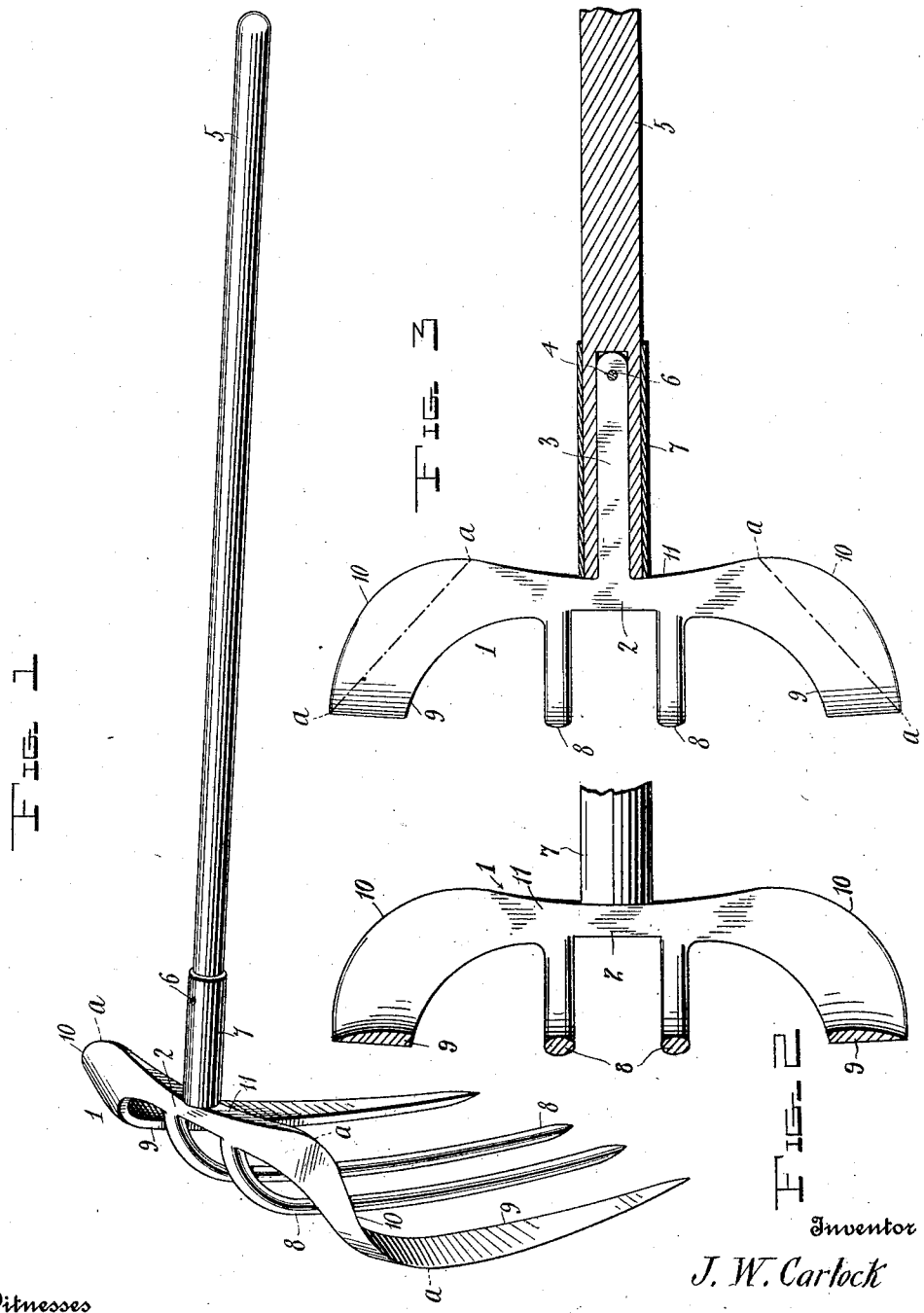

JOB W. CARLOCK, OF GRAYSVILLE, TENNESSEE.

HOE.

1,005,152. Specification of Letters Patent. Patented Oct. 10, 1911.

Application filed February 14, 1911. Serial No. 608,524.

*To all whom it may concern:*

Be it known that I, JOB W. CARLOCK, a citizen of the United States, residing at Graysville, in the county of Rhea, State of Tennessee, have invented certain new and useful Improvements in Hoes; and I do hereby declare the following to be a full, clear, and exact description of the invention, such as will enable others skilled in the art to which it appertains to make and use the same.

This invention relates to a hoe and more particularly to those constructed in the form of a raking fork.

The object of the invention is to construct a device of the character described in such a manner that in addition to the ordinary function of a hoe, a potato digger and also a cutter and scraper is provided in one and the same implement for clearing plants or other productive vegetation of weeds or other foreign and undesirable growth which usually retard the growth or destroy such vegetation.

Another important object of the invention is the construction of the implement of a single piece of metal whereby the same is rendered simple, durable and effective for the various purposes for which the same is intended, and will further withstand the rough usage to which such implements are necessarily subjected.

Briefly stated the invention consists of a hoe having a connecting head or body portion properly formed, from which the teeth project, a shank extending from the rear portion of said head and forming an integral part thereof for attaching the implement to a suitable handle, the two oppositely located teeth being formed to provide cutting and scraping blades, and intermediately disposed teeth closely assembled and arranged parallel with one another, the oppositely disposed cutting teeth being positioned at a suitable distance from the intermediate teeth whereby a sufficient clearing space is provided between the cutting blades and said intermediate teeth to prevent clogging.

With the above object in view the invention consists of the novel details of construction and combination of parts hereinafter fully described and claimed, it being understood that various modifications may be made in the minor details of construction within the scope of the appended claims.

In the drawings:—Figure 1 is a perspective view of the complete invention, Fig. 2 is a horizontal sectional view taken through the teeth showing the handle partly broken away. Fig. 3 is a top plan view of the invention.

Referring now to the drawings, 1 represents the improved implement which as before stated is composed of a single piece of metal and is provided with a connecting head or body portion 2, from the rear central portion of which projects a shank 3 having a perforation 4 located therein adjacent to the end thereof.

A handle 5 is of the usual construction and is provided with a receiving socket for the shank 4, the implement being securely and rigidly fixed to the handle by means of a pin 6 passing through a sleeve 7 surrounding the lower end of the handle 5 and the latter, and also through said perforation in the shank.

Projecting from the head or body portion 2 of the implement and curved downwardly therefrom are two teeth 8 which are arranged parallel to one another and closely positioned, said teeth being of a uniform size throughout their entire length and elliptical in cross section.

The combined cutting and scraping teeth 9 are located on either side of the centrally disposed teeth 8 and form the opposite terminal ends and a continuation of the head 2, said teeth 9 being located at a considerable distance from the teeth 8 and tapered throughout their entire length, with their inner straight edges, however, arranged in parallel relation to the teeth 8, whereby the teeth of the implement are symmetrically arranged.

The most important feature of the invention resides in the particular construction of the outer edges of the teeth 9 which provide the cutting and scraping portions of the teeth, the blade portion of the latter extending from the dotted lines *a—a* which embodies the exterior curved edge 10 leading from the thickened portion 11 of the head 2 to a point where the tooth projects downwardly on a plane with the teeth 8. It is also to be observed in this connection that the blade portions of the teeth 9 taper from the rear thickened edges of the same to the outer edges thereof, said blade portions of the teeth being slightly convexed in cross section, whereby the weeds or other undergrowth to be removed is practically operated upon and conveniently removed, said convex surfaces properly guiding and directing the earth and undergrowth through the widened spaces between the teeth referred to and the centrally disposed teeth 8.

From the foregoing description it will be readily observed that the entire scraping and cutting is accomplished by applying the implement to the ground in such a manner as to cause the curved cutting edges to come in contact therewith adjacent to the head or body portion 2 in which operation the ends of the teeth will be elevated above the ground to be operated upon. It is further to be noted in this connection that by forming the cutting edges on the curved portions of the blades 9 the same will readily enter the ground and conveniently remove the weeds or other undergrowth, and further by slightly elevating the handle and bringing the ends of the teeth of the implement closer to the ground the latter is scraped in an efficient manner, the practical operation of the device depending entirely upon the angular position of the handle of the implement.

What is claimed, is:—

1. A device of the character described comprising a head, the rear edge of which is thickened, a shank extending from said thickened portion of the head, intermediately disposed teeth of uniform dimensions throughout their entire length and arranged in parallel relation to one another, tapering cutting and scraping teeth forming the opposite terminal portions of said head and having outer curved edges and inner straight edges, the latter being arranged in parallel relation to the first named teeth, the front surfaces of said tapering teeth being convexed from the inner thickened edges to the outer curved edges thereof, whereby cutting and scraping edges are formed about the curved portions of said teeth adjacent to the handle portion of the implement.

2. A device of the character described, comprising a head or body portion, a shank projecting centrally from the rear thickened edge of the same, tapering cutting and scraping teeth curved and extending downwardly from the opposite broadened ends of said body portion, the front surfaces of said teeth being convexed from their inner thickened edges to the outer curved edges thereof adjacent to the body portion forming cutting edges, and a pair of intermediate teeth disposed between the first named teeth, the space between the same being less than the spaces between the outer tapering teeth and said pair of intermediate teeth.

In testimony whereof, I affix my signature, in presence of two witnesses.

JOB W. CARLOCK.

Witnesses:
KENAS JOHNSON,
EARL FURLONG.

---

Copies of this patent may be obtained for five cents each, by addressing the "Commissioner of Patents, Washington, D. C."